United States Patent
Fukushi et al.

(10) Patent No.: US 7,373,029 B2
(45) Date of Patent: May 13, 2008

(54) OPTICAL FIBER IMPULSE SENSOR FABRICATING METHOD

(75) Inventors: Morihisa Fukushi, Hitachi (JP); Yasuyuki Hishida, Hitachi (JP); Akira Suzuki, Hekinan (JP); Shigenori Kobayashi, Hazu-gun (JP); Hiroyuki Takahashi, Nishikamo-gun (JP); Ryotaro Kachu, Nishikamo-gun (JP)

(73) Assignees: Hitachi Cable, Ltd., Tokyo (JP); Denso Corporation, Kariya, Aichi-Pref (JP)

( * ) Notice: Subject to any disclaimer, the term of this patent is extended or adjusted under 35 U.S.C. 154(b) by 0 days.

(21) Appl. No.: 11/652,642

(22) Filed: Jan. 12, 2007

(65) Prior Publication Data

US 2007/0183734 A1    Aug. 9, 2007

(30) Foreign Application Priority Data

Jan. 16, 2006    (JP)    ............................. 2006-007288

(51) Int. Cl.
*G02B 6/00*    (2006.01)

(52) U.S. Cl. ............................ 385/12; 385/65; 385/83; 264/1.25

(58) Field of Classification Search ............... 264/1.24, 264/1.25; 385/12, 65, 83, 137
See application file for complete search history.

(56) References Cited

U.S. PATENT DOCUMENTS

2003/0142920 A1*    7/2003    Dallas et al. .................. 385/80

FOREIGN PATENT DOCUMENTS

JP    2005-140752    6/2005
JP    2006343129 A  * 12/2006

* cited by examiner

*Primary Examiner*—Hemang Sanghavi
(74) *Attorney, Agent, or Firm*—McGinn IP Law Group, PLLC

(57) ABSTRACT

A method for fabricating an optical fiber impulse sensor having an optical fiber and a molded portion molded around the perimeter of the optical fiber. The method forms, in the molded portion, an optical fiber insertion hole and an optical fiber insertion slit for inserting the optical fiber into the optical fiber insertion hole. The method inserts the optical fiber from the slit into the optical fiber insertion hole.

4 Claims, 4 Drawing Sheets

FIG. 2A
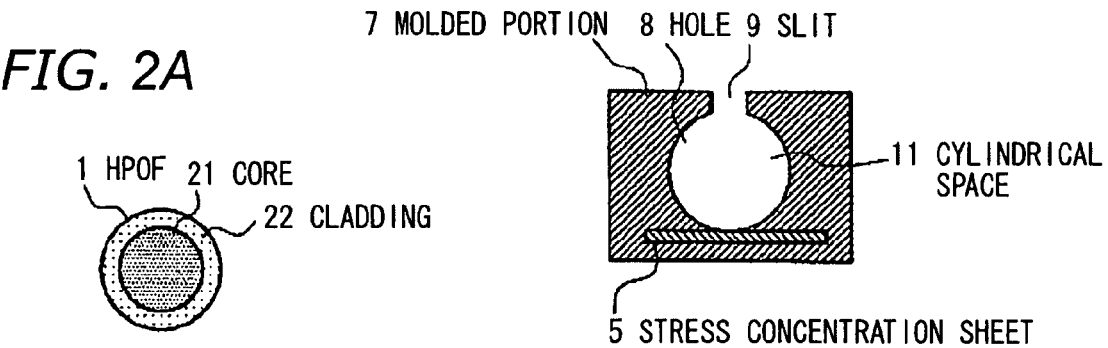
FIG. 2B
FIG. 2C
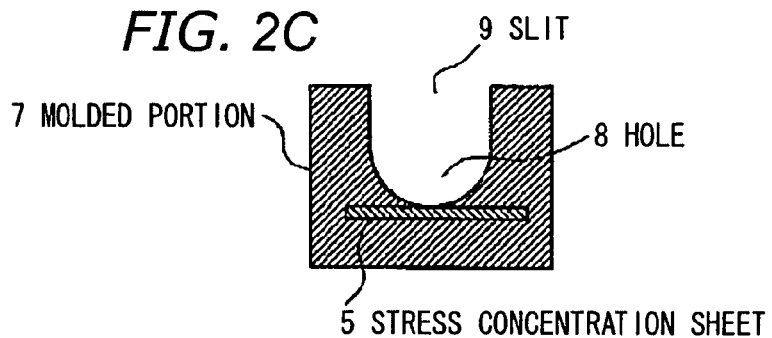
FIG. 3
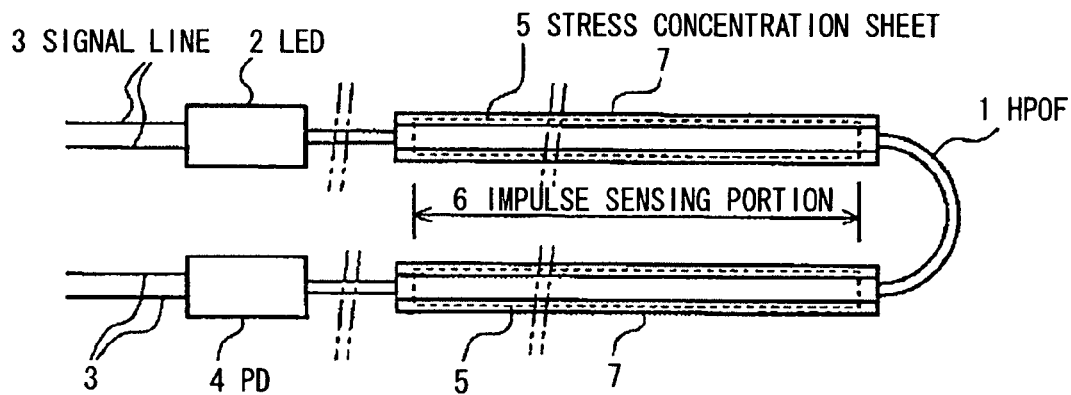

FIG. 4
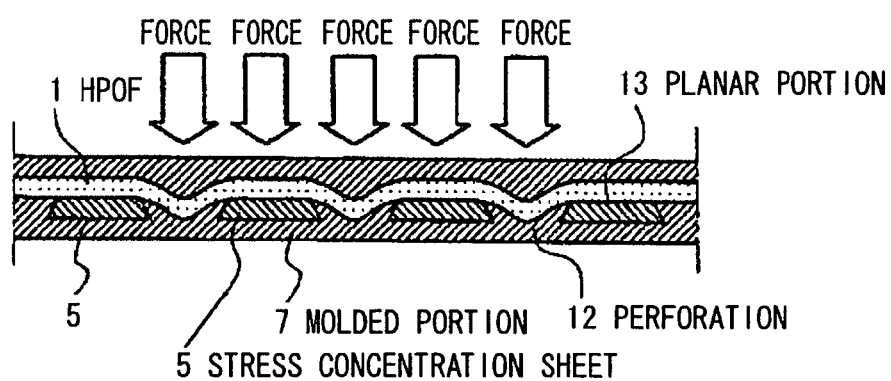
FIG. 5A     FIG. 5B
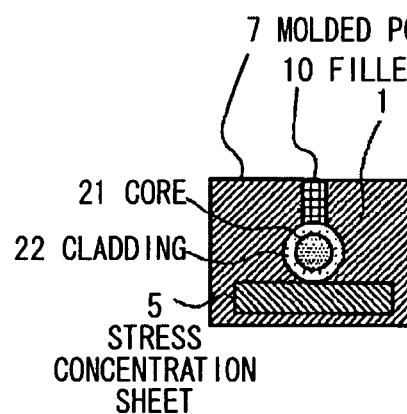 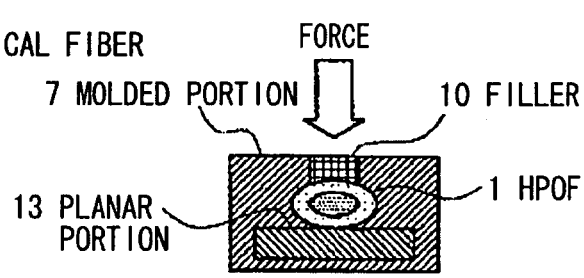

OPTICAL FIBER IMPULSE SENSOR FABRICATING METHOD

The present application is based on Japanese patent application No. 2006-007288, the entire contents of which are incorporated herein by reference.

BACKGROUND OF THE INVENTION

1. Field of the Invention

This invention relates to an optical fiber impulse sensor fabrication method, which senses an impulse by converting the impulsive stress into an optical transmission characteristic of the optical fiber, and which enhances workability.

2. Description of the Related Art

As an optical fiber impulse sensor, there is a type in which a stress concentration sheet with square perforations is mounted in a straight portion of a U-folded or straightened heat-resistant plastic optical fiber (hereafter, referred to as HPOF), for example, and in which a rubber material is molded in constant width and thickness around the perimeter of those HPOF and stress concentration sheet.

A conventional optical fiber impulse sensor fabrication method is as follows: An iron round bar is placed along a stress concentration sheet in a rubber material to extrude the rubber material so that the rubber material covers the perimeter of the iron round bar and stress concentration sheet, and the rubber material is molded by means of a press to have a square cross section, and the iron round bar is pulled and removed from the cross section to form a cavity longitudinally extending through the inside of the rubber material, and the rubber material is then secondarily cross-linked to solidify it, and air is injected into the cavity from one longitudinal end, while an HPOF is inserted up to a predetermined position from the other end.

Refer also to JP-A-2005-140752.

In inserting the HPOF into the rubber material after removing the iron round bar, however, there is the problem of poor workability caused by the air injection into the cavity being complicated, and by the HPOF insertion into the cavity being time-consuming.

SUMMARY OF THE INVENTION

Accordingly, it is an object of this invention to provide an optical fiber impulse sensor fabrication method, which obviates the above problem, to enhance workability.

(1) According to one aspect of the invention, a method for fabricating an optical fiber impulse sensor comprising an optical fiber and a molded portion molded around the perimeter of the optical fiber, comprises the steps of:

forming, in the molded portion, an optical fiber insertion hole and an optical fiber insertion slit for inserting the optical fiber into the optical fiber insertion hole, and inserting the optical fiber from the slit into the optical fiber insertion hole.

In the above invention (1), the following modifications and changes can be made.

(i) The step of forming the optical fiber insertion hole and the slit comprises integrally forming the optical fiber insertion hole and the slit to have a substantially keyhole-shaped cross section.

(ii) The method further comprises, following the step of inserting the optical fiber into the optical fiber insertion hole, filling the optical fiber insertion hole and the slit with a filler.

(2) According to another aspect of the invention, a method for fabricating an optical fiber impulse sensor comprising an optical fiber and a molded portion-molded around the perimeter of the optical fiber, comprises the steps of:

extruding and molding a mold material;

using a die for pressing and molding that comprises a protrusion formed in an integral shape of an optical fiber insertion hole and an optical fiber insertion slit, to press and mold the mold material to form the molded portion, and form therein the optical fiber insertion hole and the optical fiber insertion slit;

inserting the optical fiber from the slit into the optical fiber insertion hole, and filling the optical fiber insertion hole and the slit with a filler.

Advantages of the Invention

The invention exhibits the excellent effect of being capable of enhancement in workability.

BRIEF DESCRIPTION OF THE DRAWINGS

The preferred embodiments according to the invention will be explained below referring to the drawings, wherein:

FIG. 2A is a cross-sectional view showing an HPOF as an optical fiber used in the present invention;

FIG. 2B is a cross-sectional view showing a molded portion used in the present invention;

FIG. 2C is a cross-sectional view showing a molded portion in another embodiment;

FIG. 3 is a plan view showing use of an optical fiber impulse sensor in one embodiment according to the present invention;

FIG. 4 is a cross-sectional view showing an impulse-applied optical fiber impulse sensor in one embodiment according to the present invention;

FIG. 5A is a cross-sectional view showing a planar portion during no impulse application;

FIG. 5B is a cross-sectional view showing the planar portion during impulse application.

DETAILED DESCRIPTION OF THE PREFERRED EMBODIMENTS

Optical Fiber Impulse Sensor Fabrication Method

FIGS. 1A-1H show a process for fabricating an optical fiber impulse sensor according to the present invention.

Figure 1A:
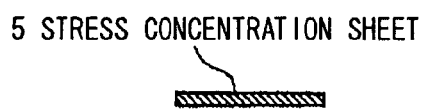
FIGS. 1A-1H are diagrams showing a process for molding an optical fiber insertion hole according to the present invention.
Figure 1B:
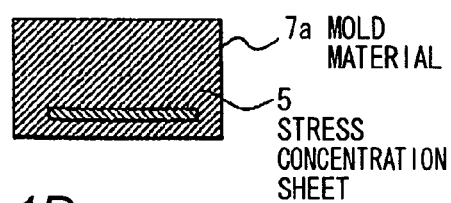

Around the perimeter of a stress concentration sheet 5 shown in FIG. 1A, is extruded and molded a mold material 7a, as shown in FIG. 1B. It should be noted, however, that this invention is applicable even in the case of no stress concentration sheet 5.

Figure 1C:
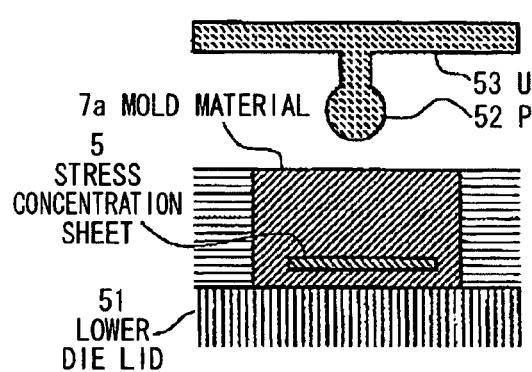

As shown in FIG. 1C, this is followed by mounting the mold material 7a to a lower die lid 51 for pressing and molding. An upper die lid 53 for pressing and molding, which has a protrusion 52 formed in an integral shape of an optical fiber insertion hole 8 and an insertion slit 9 (in the figure, a shape having a substantially keyhole-shaped cross section) is caused to face the lower die lid 51 for pressing and molding.

Figure 1D:
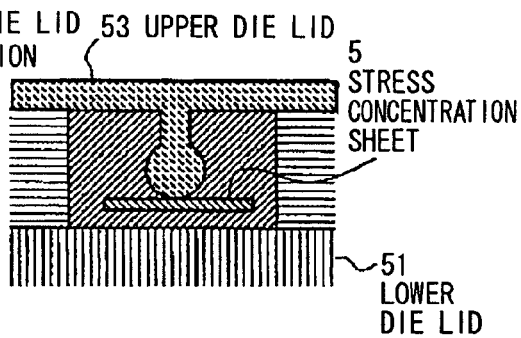
Figure 1E:
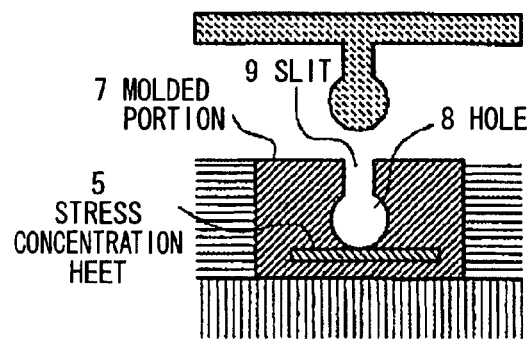

As shown in FIG. 1D, the upper die lid 53 is pressed down and fitted on the lower die lid 51, and as shown in FIG. 1E, is then removed upward therefrom, which results in an optical fiber insertion hole 8 and slit 9 molded portion 7.

Figure 1F:
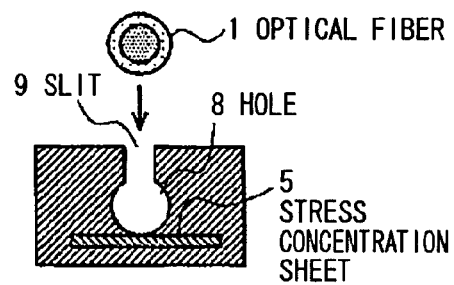
Figure 1G:
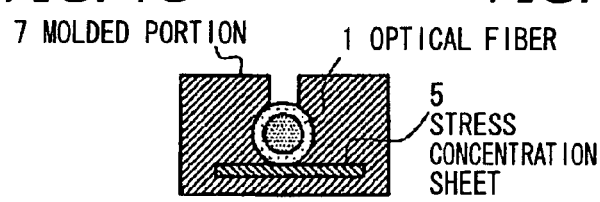

As shown in FIG. 1F, an optical fiber 1 is caused to face the slit 9, and as shown in FIG. 1G, is inserted through the slit 9 into the hole 8.

Figure 1H:
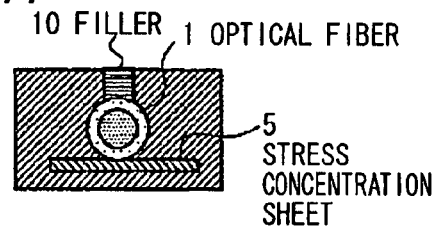

Finally, as shown in FIG. 1H, the slit 9 is filled with filler 10.

Since, in this manner, the method according to this invention forms the slit in the mold material, and inserts the optical fiber through the slit into the hole, it is possible to substantially shorten optical fiber impulse sensor fabrication time.

Also, the optical fiber insertion hole 8 and slit 9 of this invention can be molded by pressing the upper die lid 53 with the protrusion 52 having a substantially keyhole-shaped cross section.

Optical Fiber Impulse Sensor Structure

Next, there are explained constituent members of the optical fiber impulse sensor.

As shown in FIG. 2A, an HPOF 1 comprises a core 21, which uses a cross-linked acryl resin, and cladding 22 covering the perimeter of the core 21, which uses a fluorine-based material whose refractive index is lower than a refractive index of the core 21.

As shown in FIG. 2B, a molded portion 7 includes an optical fiber insertion hole 8 which covers a stress concentration sheet 5 and in which the HPOF 1 is placed. The cross-sectional profile of the molded portion 7 may be determined appropriately according to applications and uses, but is herein assumed as being square. The stress concentration sheet 5 is positioned adjacent to the bottom of the molded portion 7. The optical fiber insertion hole 8 has a cylindrical space 11 with an appropriate inner diameter such that the HPOF 1 of FIG. 2A is just fitted therein, and the cylindrical space 11 is open on one side to form an optical fiber insertion slit 9. The molded portion has thickness at both edges of the slit 9, and the slit 9 therefore forms a quadrangular space adjacent to the hole 8. The molded portion 7 uses a rubber material (e.g., silicon rubber) softer than the stress concentration sheet 5.

The molded portion 7 may include the optical fiber insertion hole 8 and slit 9 integrally formed to have a substantially keyhole-shaped cross section. The HPOF 1 inserted from the slit 9 can be held in the hole 8, and positioned in the hole 8.

As shown in FIG. 2C, by making the opening width of the slit 9 substantially equal to the diameter of the hole 8, the hole 8 and slit 9 may also be integrally formed to have a substantially U-shape cross section.

The stress concentration sheet 5 is formed of a material at least harder (harder to be deformed by stress) than the HPOF 1 and by a strip member in the longitudinal direction of the HPOF 1, and has square perforations (not shown) punched therethrough longitudinally at appropriate pitches. These perforations effectively serve to have a micro-bend effect, as will be described later. The stress concentration sheet 5 is formed of a hard plastic or a metal such as brass, stainless steel, etc., for example.

Use of the Optical Fiber Impulse Sensor

FIG. 3 shows use of the optical fiber impulse sensor. To one end of an optical fiber (herein, an HPOF) 1 is connected a light source (herein, an LED (Light-emitting diode) 2. To the LED 2 is connected a metallic signal line 3 for transmitting electrical signals between it and a controller (not shown). The HPOF 1 is laid along a location or object to sense an impulse acting thereon and is U-folded or straightened. To the other end of the HPOF 1 is connected a light receiver ((herein, a PD (photodiode)) 4. To the PD 4 is connected a metallic signal line 3 for transmitting electrical signals between it and a controller (not shown).

The principle of impulse sensing is that the HPOF 1 deformed by an impulse causes a variation in its optical transmission characteristic due to its micro-bend effect, to cause a difference in optical intensity between a signal transmitted from the LED 2 and a signal received by the PD 4, and to thereby allow this difference to be analyzed by the controller to sense an impulse. It is also considered that a colliding object is identified from a varying waveform of optical intensity.

Advantages of the Optical Fiber Impulse Sensor

The advantages of the optical fiber impulse sensor of this kind are as follows:

(1) The HPOF 1 sensor is unaffected by electromagnetic noise even in the event the electromagnetic noise is noticeable in use environment.

(2) No electromagnetic noise is allowed to affect the LED 2, PD 4, metallic signal line 3 because the HPOF 1 itself is formed of a signal transmission member with less transmission loss compared to metallic signal lines, and can therefore be laid as a transmission line to a distant location where electromagnetic noise is difficult to reach it from a portion for laying the HPOF 1 sensor.

(3) It is not necessary to expose the LED 2, PD 4, metallic signal line 3 in space and it is also possible to surround them with a shield for shielding them from electromagnetic noise, because they do not belong to an impulse sensing portion 6, as will be described later.

Operation of the Optical Fiber Impulse Sensor

Impulse sensing by the optical fiber impulse sensor of this invention is explained by referring to FIGS. 4 and 5.

As shown in FIG. 4, when an impulse acts on the molded portion 7 from above, the HPOF 1 is pressed down by the impulsive force. The impulsive force is assumed to act over a certain longitudinal length. But beneath the HPOF 1, there is the stress concentration sheet 5 harder than the HPOF 1, and the stress concentration sheet 5 has perforations 12 punched therethrough at appropriate pitches. For this reason, the HPOF 1 is not bent down in thickness portions (hereafter, referred to as planar portions) 13 of the stress concentration sheet 5, and is bent down to sink only in the perforations 12. Thus, as shown, the HPOF 1 is bent at both edges of each perforation 12. In this manner, bend strain is securely caused in the plural portions, which therefore effectively has the micro-bend effect of allowing a good increase in transmission loss caused by the impulse.

Deformation at cross sections in the planar portions 13 of the stress concentration sheet 5 is as follows.

As shown in FIG. 5A, when no impulse is applied to the molded portion 7, the molded portion 7 is in as a natural state of thickness and width as when fabricated, and the HPOF 1 is also held in a circular natural state of its cross section.

As shown in FIG. 5B, when an impulsive force is applied to the molded portion 7 from above, the molded portion 7 becomes thin. This impulsive force also reaches the HPOF 1, to press the HPOF 1 against the planar portions 13 of the stress concentration sheet 5, and deform the cross section of the HPOF 1 in such a manner as to compress the vertical diameter of the HPOF 1, and widen the horizontal diameter of the HPOF 1. This allows an increase in transmission loss caused by the compression strain.

Figure 6:
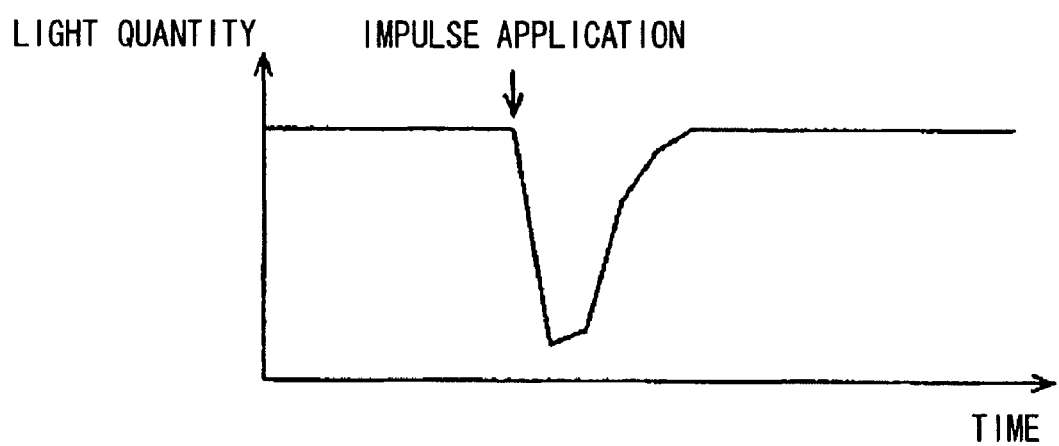
FIG. 6 is a waveform chart showing light quantity versus time.

FIG. 6 shows a waveform of light quantity received by the light receiver (PD) 4 of FIG. 3, when varied with time by an impulse. Before the impulse is applied, light injected into the HPOF 1 from the light source (LED) 2 is emitted to the light receiver without attenuation due to the micro-bend effect, and a constant light quantity can therefore be detected. But the moment the impulse is applied, the light quantity drops sharply. Thereafter, when the impulsive force is removed, residual strain in the molded portion 7 and the HPOF 1 is gradually eliminated, which accompanies the gradual recovery of the light quantity.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method for fabricating an optical fiber impulse sensor comprising an optical fiber and a molded portion molded around the perimeter of the optical fiber, the method comprising the steps of:
   forming, in the molded portion, an optical fiber insertion hole and an optical fiber insertion slit for inserting the optical fiber into the optical fiber insertion hole, and
   inserting the optical fiber from the slit into the optical fiber insertion hole.

2. The method according to claim 1, wherein:
   the step of forming the optical fiber insertion hole and the slit comprises integrally forming the optical fiber insertion hole and the slit to have a substantially keyhole-shaped cross section.

3. The method according to claim 1, further comprising:
   following the step of inserting the optical fiber into the optical fiber insertion hole, filling the optical fiber insertion hole and the slit with a filler.

4. A method for fabricating an optical fiber impulse sensor comprising an optical fiber and a molded portion molded around the perimeter of the optical fiber, the method comprising the steps of:
   extruding and molding a mold material;
   using a die for pressing and molding that comprises a protrusion formed in an integral shape of an optical fiber insertion hole and an optical fiber insertion slit, to press and mold the mold material to form the molded portion, and form therein the optical fiber insertion hole and the optical fiber insertion slit;
   inserting the optical fiber from the slit into the optical fiber insertion hole, and
   filling the optical fiber insertion hole and the slit with a filler.

\* \* \* \* \*